United States Patent [19]

Mooney et al.

[11] Patent Number: 4,586,393
[45] Date of Patent: May 6, 1986

[54] MINIMUM FIT WORM AND GEAR DRIVE

[75] Inventors: Paul C. Mooney, Northbrook; Theodore F. Koch, Elmhurst, both of Ill.

[73] Assignee: Quick-Set Incorporated, Northbrook, Ill.

[21] Appl. No.: 690,397

[22] Filed: Jan. 9, 1985

Related U.S. Application Data

[63] Continuation-in-part of Ser. No. 587,136, Mar. 7, 1984, abandoned.

[51] Int. Cl.⁴ .................. F16H 35/06; F16H 1/16; F16H 1/20; F16H 35/08
[52] U.S. Cl. .................. 74/396; 74/395; 74/425; 74/409; 74/406; 74/411.5; 74/411
[58] Field of Search ............ 74/425, 427, 411.5, 74/411, 406, 395, 396, 406, 606 R; 248/183, 185

[56] References Cited

U.S. PATENT DOCUMENTS

| | | | |
|---|---|---|---|
| 1,072,282 | 9/1913 | Waninger | 74/425 |
| 2,335,606 | 11/1943 | Pelphrey | 74/396 |
| 2,348,734 | 5/1944 | Freeman | 74/425 |
| 2,929,317 | 3/1960 | Baumgartner et al. | 74/425 |
| 2,989,874 | 6/1961 | Johnson | 74/427 |
| 3,813,958 | 6/1974 | Meyer | 74/425 |
| 4,040,307 | 8/1977 | Koster | 74/425 |
| 4,187,933 | 2/1980 | Calabrese et al. | 74/425 |
| 4,220,053 | 9/1980 | Barlow et al. | 74/425 |
| 4,464,948 | 8/1984 | Lindemeyer | 74/411.5 |

FOREIGN PATENT DOCUMENTS

| | | | |
|---|---|---|---|
| 17462 | of 1904 | United Kingdom | 74/396 |
| 853055 | 11/1960 | United Kingdom | |
| 2126314 | 3/1985 | United Kingdom | |

Primary Examiner—Lawrence J. Staab
Assistant Examiner—Michael D. Bednarek
Attorney, Agent, or Firm—Wood, Dalton, Phillips, Mason & Rowe

[57] ABSTRACT

A structure providing minimum fit mounting and rigid locking of a worm and gear drive includes a gear rotatably supported to a base, a worm drivably engaging the gear and bearings supporting the worm for rotation about its axis. A housing supports the worm bearings and is itself rotatably supported to the base for rotation about a second axis, which axis is parallel to but eccentric from the worm axis. Means are provided for pivoting the bearing housing such that the eccentricity of the pivot axes causes the worm to move toward the gear for close mounting and/or rigid locking therebetween.

15 Claims, 6 Drawing Figures

MINIMUM FIT WORM AND GEAR DRIVE

DESCRIPTION

This application is a continuation-in-part of application Ser. No. 587,136, filed Mar. 7, 1984 now bandoned.

BACKGROUND OF THE INVENTION

1. Field of the Invention

This invention is directed to worm and gear drives, and more particularly to a structure providing minimum backlash, and/or rigid locking between the worm and gear upon completion of driving.

2. Background Art

Worm and gear drives are well known in the art. Such drives have many uses, including driving pan and tilt housings for TV cameras and for radio or microwave equipment. In such uses, it is desirable, and often crucial, that the clearance between the worm and gear be minimized to eliminate any backlash or looseness which would cause a wobble in the supported equipment. Such a wobble is highly undesirable when, for example, attempting to view the picture on a TV camera taken through a telephoto lens.

Heretofore, the worm, its shaft and its bearings have been mounted in a carrier and that carrier has been adjusted radially to the gear during assembly to move the worm and gear together. In practice, there is always some eccentricity in the worm teeth and the gear teeth, and therefore, in view of the inability to form perfect parts, a running clearance has been maintained between the teeth to avoid jamming. Further, due to the common and unavoidable eccentricities and other variations in the worm and gear, when the carrier has been adjusted for a minimum fit, of necessity it has been positioned to provide that minimum fit when the high sides of the worm and gear are together. At all other positions there is a greater spacing between the teeth than at the minimum fit position leading to clearances allowing undesirable looseness, wobble, vibration and the like.

The carriers used to arrange the worm for minimum fit have been relatively difficult to adjust to provide minimum fit between the worm and gear. Even when the worm is properly mounted to provide a minimum fit, that backlash and looseness is minimized in only one position of the worm and gear. There is in fact a backlash and looseness between the worm and gear in every other position, which looseness can result in a wobble in the supported equipment and/or other undesirable effects in the output shaft.

The present invention is directed toward overcoming one or more of the problems as set forth above.

SUMMARY OF THE INVENTION

In one aspect of the present invention, a structure easily allowing for the minimum fit mounting of a worm and gear drive is provided. The worm and gear drive includes a gear rotatably supported to a base, a worm drivably engaging the gear and bearings supporting the worm for rotation about its axis. A housing supports the worm bearings and is itself rotatable supported to the base for rotation about a second axis, which axis is parallel to but eccentric from the worm axis. Means are provided for pivoting the bearing housing such that the eccentricity of the pivot axes causes the worm to move toward the gear to provide for a minimum fit therebetween. The worm can therefore be easily mounted during assembly to provide the tightest practical fit for that particular drive.

In another aspect of the present invention, means are provided for biasing the bearing housing toward pivoting about the second axis to thereby bias the worm toward the gear. In still another aspect of the present invention, means are provided for pivoting the bearing housing in response to termination of driving of the worm so as to move the worm toward the gear for rigid locking therebetween. This drive structure has running clearance between the worm and gear during driving, while rigidly locking the worm and gear together upon the completion of driving, thereby eliminating wobble in the drive. Such wobble is highly undesirable in many uses, including particularly pan and tilt housings which support cameras with telephoto lenses. The present structure simply and inexpensively provides a drive which eliminates wobble.

DESCRIPTION OF THE PREFERRED EMBODIMENTS

Figure 1:
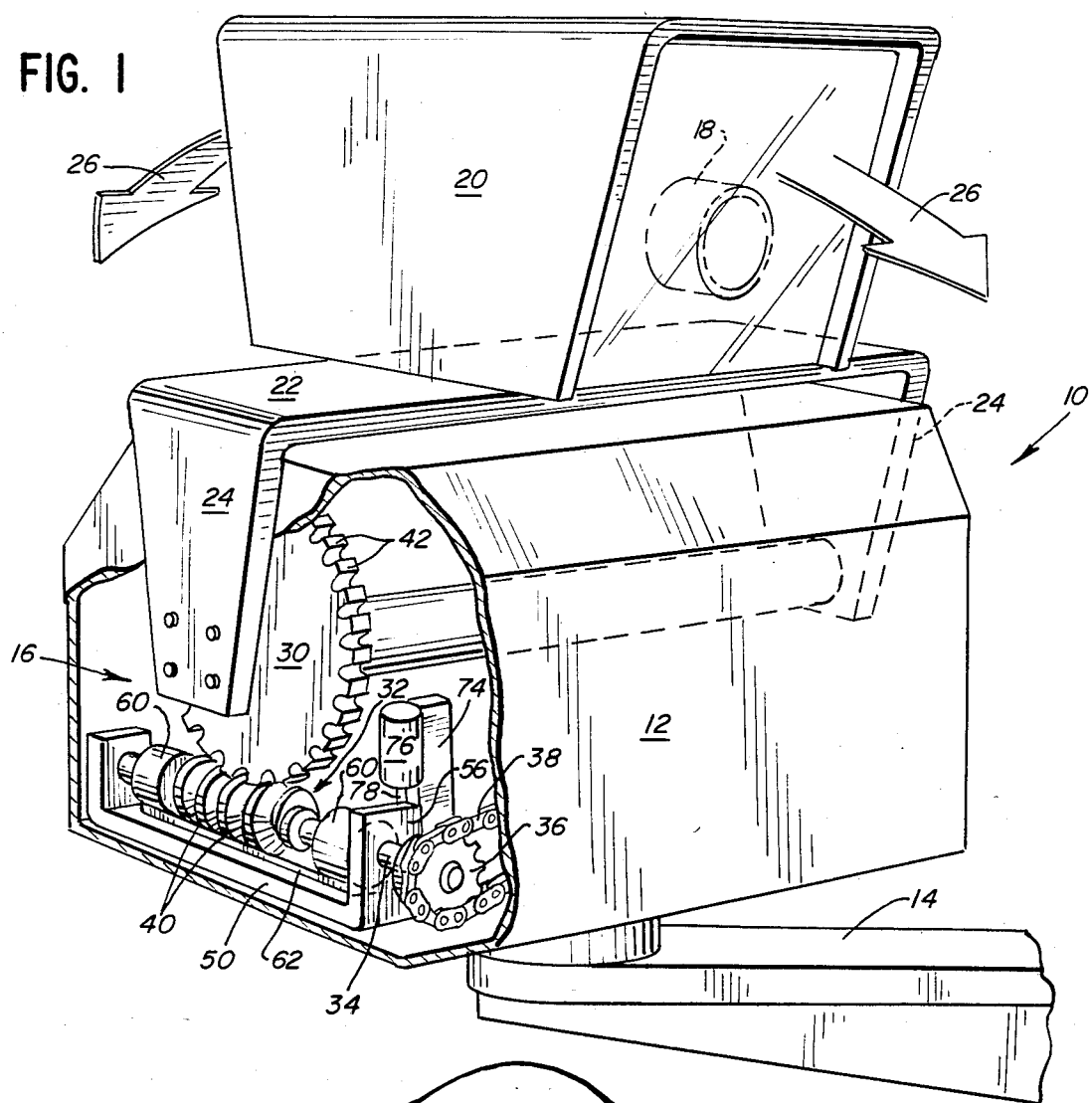
FIG. 1 is a partially broken away perspective view of the camera pan and tilt housing embodying the drive mechanism.
Figure 2:
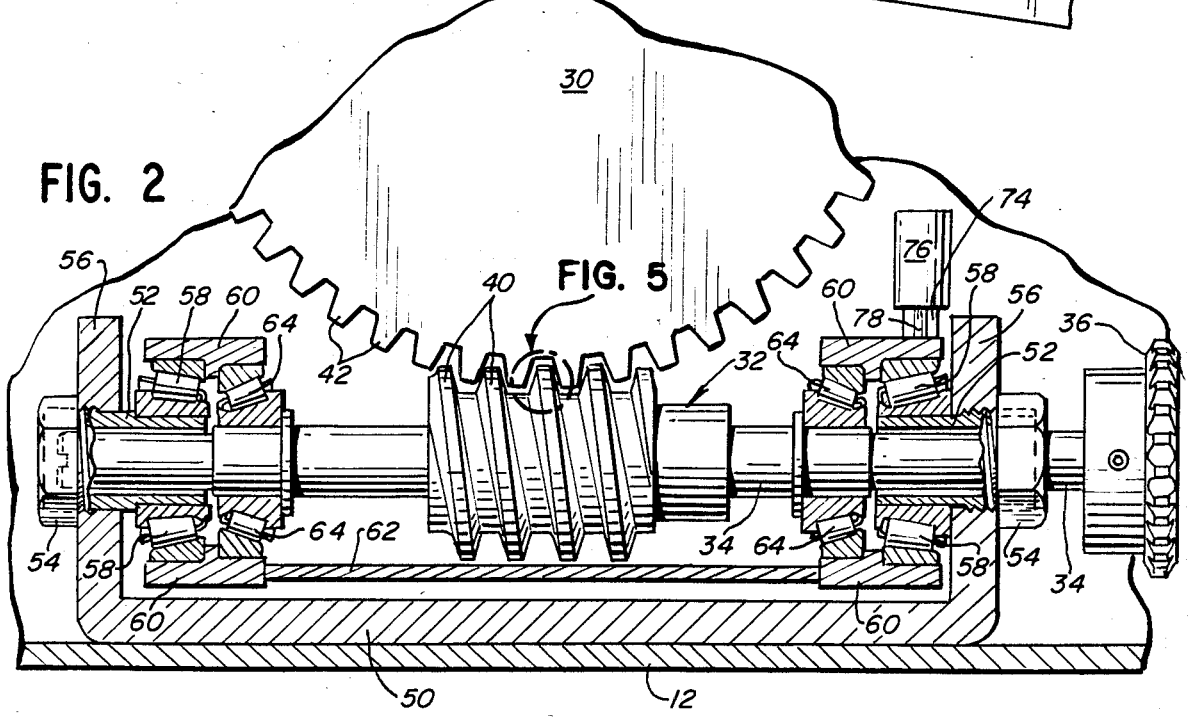
FIG. 2 is a partial cross-sectional view of the drive mechanism.

A camera pan and tilt housing 10 embodying the present invention is shown in FIG. 1. A drive housing 12 is suitably supported in an installation, as by the support arm 14 shown. The drive housing 12 encloses the worm and gear drive 16 for tilt motion of the camera, as well as a drive (not shown) which pivots the drive housing 12 about a vertical axis for panning motion. Although the drive for panning motion is not illustrated so as to avoid cluttering FIG. 1, it should be understood that a drive similar to the worm and gear drive 16 illustrated for controlling tilt motion (which will be described below) may also be used. Further, the improved drive 16 as described hereafter may suitably be used in other applications where it is desirable to drive an output shaft.

The camera 18 is enclosed in a camera housing 20 which is supported on a platform 22. The platform 22 has downwardly depending support legs 24 secured, as by suitable bearings (not shown), for rotation about a horizontal axis with respect to the drive housing 12. Rotation of the platform 22 about this horizontal axis thus causes tilting of the camera 18 as indicated by the arrows 26.

The worm and gear drive 16 includes a tilt gear 30 which is drivably connected to pivot with the platform support legs 24. A worm 32 meshes with the tilt gear 30 and on one end of its shaft 34 has a sprocket 36 driven by a chain 38. The chain 38 is driven by a motor (not shown) which is typically controlled by a remote operator, enabling the operator through pan and tilt motions to orient the camera 18 in virtually any direction desired.

As previously discussed, a close fit is required in many applications to secure the supported object with little or no wobble, and in other applications a rigid locking may be required to prevent external forces from rotating the gear 30 or worm 32, particularly when subjected to vibration. For example, with camera housings 10 as illustrated, where the camera 18 has a telephoto lens and may be viewing areas several hundred yards away, a looseness in the drive 16 allowing a 1° pivot would result in a wobble covering several yards in the area which the operator is attempting to view, thereby making it virtually impossible to effectively view that area. However, while it may be undesirable to have any looseness in the drive 16 from the standpoint of rigidity of the camera 18, it is nevertheless always present in current construction as a practical matter. The worm and gear drive 16 can as a practical matter be mounted to provide a minimum fit at only one rotational position of the worm 32 and gear 30.

Reference will now be had particularly to FIGS. 2–5 which illustrate one embodiment in which the adjustable structure allows for minimum fit mounting and, where desirable, rigid locking of the drive 16 in any selected camera position. A support bracket 50 is fixed in the drive housing 12. A pair of sleeves 52 are suitably fixed, as by the nuts 54 shown, to upstanding legs 56 at either end of the bracket 50. Concentric bracket bearings 58 are fixed to the sleeves 52 and rotatably support a pair of bearing housings 60. A bar 62 extends between and interconnects the two bearing housings 60.

Mounted within the bearing housings 60 are a pair of worm bearings 64 which are concentric with each other to rotatably support the worm shaft 34, but are eccentric with the bracket bearings 58. Thus, the axis 66 of the worm is eccentric from the axis of the bracket bearings an amount equal to $\Delta_A$ (see FIGS. 3 and 4). Mounted to a support 74 is a fluid cylinder 76 having its piston arm 78 pivotally connected to one of the bearing housings 60. The cylinder 76 is controlled by suitable means (not shown), reciprocating the piston arm 78 to pivot the bearing housings 60 and change the orientation of the eccentricity as can be seen from a comparison of FIGS. 3 and 4. This moves the worm 32 with respect to the gear 30 to change the spacing therebetween. By moving the drive 16 through its range of motion, the position of the bearing housings providing the minimum fit can be easily determined, and can be fixed by the cylinder 76, or other suitable means, to properly mount the worm 32.

Of course, reciprocation of the piston arm 78 results in small amounts of lateral motion, and that should be suitably accounted for (for example, in the connection between the arm 78 and sleeve 60 or by pivotally mounting the cylinder 76).

In addition to easing the mounting of the worm 32 to minimize backlash, the present drive 16 can also be used to provide a rigid locking to prevent turning of the gear 30 and to virtually eliminate wobble in the supported equipment. The operation of the above-described worm and gear drive 16 in providing such locking is as follows. As the worm 32 is driven clockwise in FIG. 3, it drives the gear 30 counterclockwise in FIG. 2, causing the camera 18 to be tilted back. The forward side (i.e. the right side in FIGS. 2 and 5) of the worm tooth 40 is thus the driving surface 80 engaging the gear tooth 42. During driving, the opposite, nondriving side 82 of the worm tooth 40 is with this embodiment spaced from the gear tooth 42 (see FIG. 5).

Figure 4:
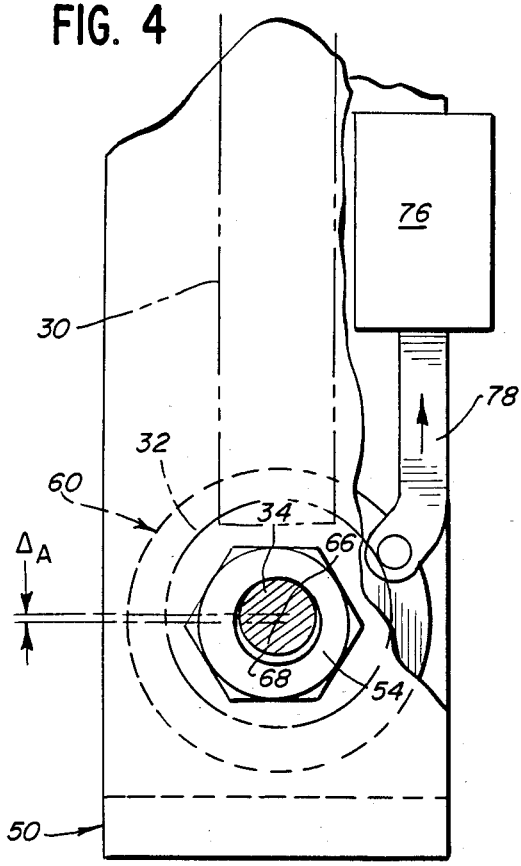
FIG. 4 is a view similar to FIG. 3 showing the structure in its locking position.

As soon as the drive motor is de-energized so that the sprocket 36 and worm 32 are no longer driven, the cylinder 76 is energized and the bearing housings 60 pivoted as shown in FIG. 4. (It will be apparent that other actuating structures could be used to accomplish this pivoting, such as solenoids, a motor and screw, a rack and pinion, etc.) This pivots the eccentricity $\Delta_A$ up and to the left in FIG. 4, and therefore causes the worm tooth 40 to move into the gear tooth 42 as shown in phantom 40' in FIG. 5. In this position, both sides 80, 82 of the worm tooth 40' engage the gear 30, thereby providing a secure and rigid friction locking of the drive 16 so that the camera 18 is supported in its selected position without any wobble.

Figure 3:
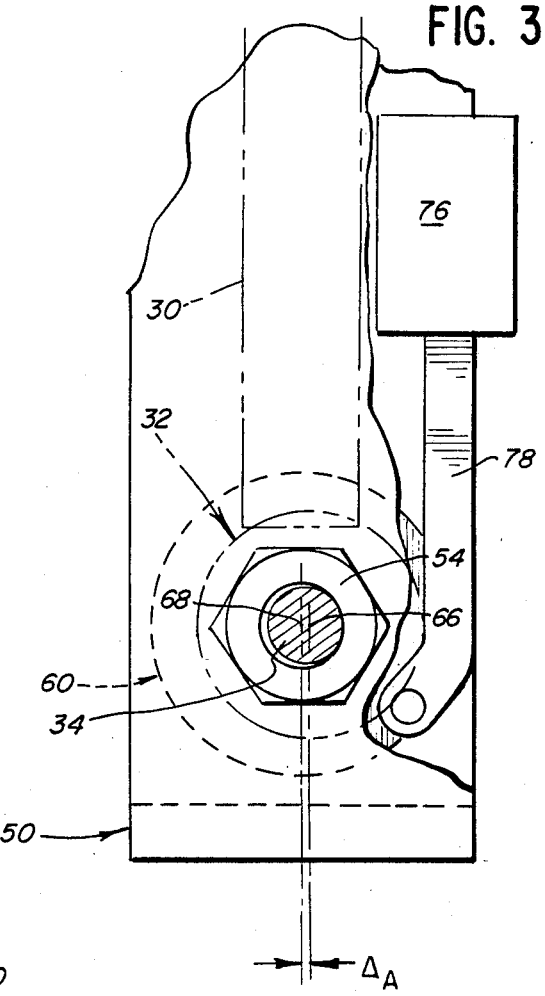
FIG. 3 is a partial view taken from the right end of FIG. 2 showing the structure in its driving position.

In the illustrations of FIGS. 3 and 4, the cylinder 76 pivots the bearing housings 60 through 90° for simplicity of illustration, but pivoting through angles other than 90° is usually desirable as will be discussed. With this configuration of pivoting, the worm 32 not only moves vertically a distance of $\Delta_V$ (equal to $\Delta_A$) but also to the left in FIG. 4 (out from FIGS. 2 and 5) the same distance $\Delta_A$. The lateral motion of the worm 32 a shown in FIG. 4 causes the worm tooth 40 to shift to the right in FIG. 5 the distance $\Delta_S$ which is the axial offset over a tangential distance $\Delta_A$ resulting from the slope of the worm tooth 40. (Of course, the vertical movement and cross-sectional configuration of the worm tooth 42 also cause an effective axial shift in opposite directions by each side 80,82 of the worm tooth 42.)

Figure 5:
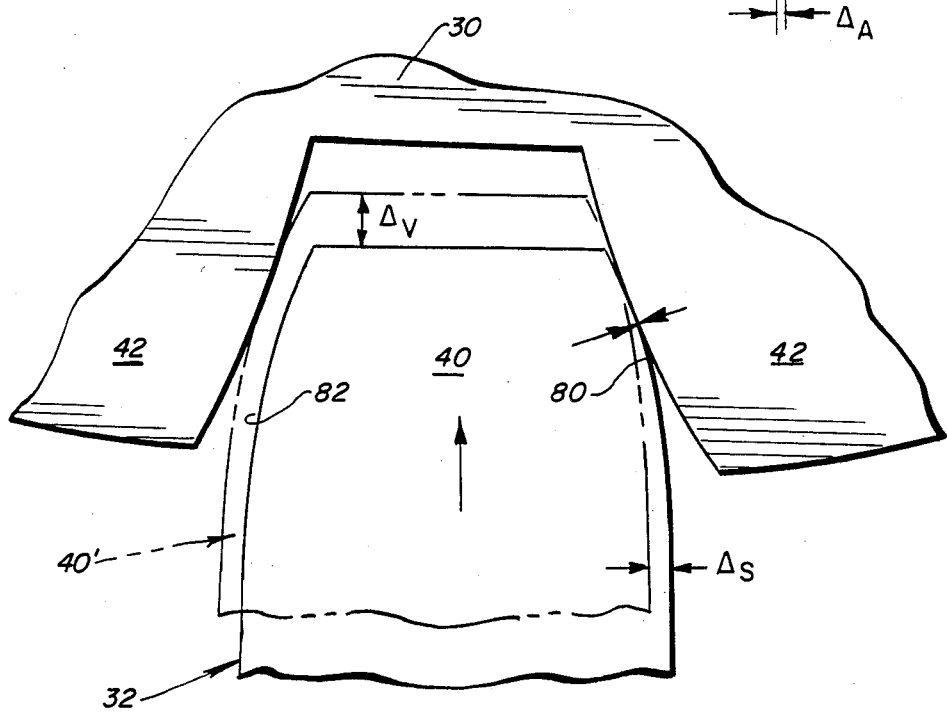
FIG. 5 is an enlarged view of the area indicated in the circle in FIG. 2.

The resultant axial motion $\Delta_S$ of the worm tooth 40' during locking is desirable when worm tooth side 80 had engaged the gear 30 during driving as illustrated in FIGS. 3–5 since it moves the worm tooth 40 into the gear teeth 42 in the position at which driving stopped. However, when driving occurs in the opposite direction, the axial motion $\Delta_S$ will cause the gear 30 to continue to move even after driving ceases as the worm tooth 40' effectively moves up and over during locking.

In some intances, this continued motion, even though small, is undesirable since it is uneven for opposite directions of drive. The operator can compensate for this additional motion when controlling the camera housing 10, but it can be confusing when the compensation differs depending upon the direction of drive. Therefore, in many uses, it is desirable to eliminate $\Delta_S$ to have an operation in which the additional motion of the gear 30 is minimal and equal in both drive directions. This can be accomplished by aligning the worm and bearing housing axes 66,68 X° from horizontal where the housing is pivoted 2X° for locking and unlocking.

Of course, due to irregularities and wear in the worm 32 and gear 30, the above-detailed configurations would be approximated during actual operation. The fluid cylinder 76 would be energized to simply pivot the bearing housings 60 to bring the worm 32 snug against the gear 30.

Figure 6:
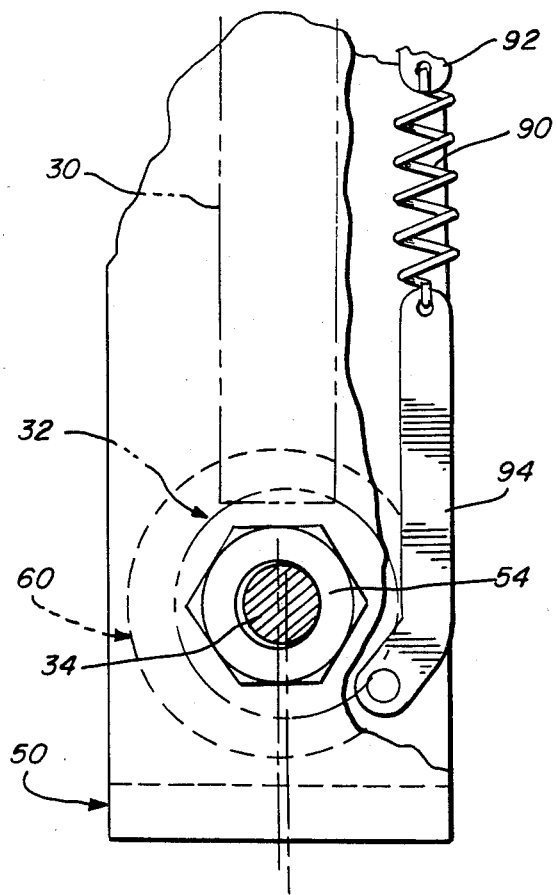
FIG. 6 is a view similar to FIG. 3 but showing an alternative embodiment.

An alternative embodiment is shown in FIG. 6 wherein the cylinder 76 of the above-described embodiment is replaced with a tension spring 90. The upper end of the tension spring is suitably secured to an ear 92 on the interior of the housing 12. The lower end of the tension spring 90 is secured to one of the bearing housings 60 through a suitable interconnection such as the arm 94 shown (similar to the piston arm 78 of the prior described embodiment). It has been found that a relatively light tension spring 90 (i.e. providing a tensile force of 6 to 10 pounds) is suitable, though greater or lesser tensile forces may be desirable in some applications. A near ideal operation is thereby provided inasmuch as the spring 90 constantly biases the worm 32 toward the gear 30 to constantly provide a minimum fit, and yet it has been found that the problem described previously with regard to the teeth jamming during turning is avoided by the provision of only a light tensile force as described. Still further, this embodiment, by eliminating the fluid cylinder 76, minimizes the cost of the drive.

In addition to the tension spring 90 shown in FIG. 6, still other biasing forces may be used to bias the worm 32 toward the gear 30, such as compression, torsion, or flexure springs, magnetic attraction or repulsion, and even gravity in some applications.

As illustrated in the figures, the worm 32 drives a non-enveloping gear 30. The present invention may also of course be used with an enveloping gear. In such drives however it is important to minimize the lateral motion of the worm 32 in order to maintain the proper orientation of the worm 32 to the enveloping gear to thereby minimize wear. This may be accomplished by, for example, providing a relatively large eccentric ($\Delta_A$) and pivoting the housings 60 through a 2X° range, X° on either side of horizontal.

The present invention thus provides a simple, inexpensive worm and gear drive which allows for easy assembly of the drive to minimize wobble, and in fact can be used to virtually eliminate wobble when the drive is stopped. Such operation is important in many uses, including pan and tilt housings for monitoring cameras. Other aspects, objects and advantages for the present invention can be obtained from a study of the drawings, the specification and the appended claims.

We claim:

1. In a worm and gear drive, including a gear rotatably supported to a base, a worm drivably engaging the gear, and bearings supporting the worm for rotation about its axis, the improvement comprising:
   a housing supporting the worm bearings, the housing being rotatably supported to the base about a second axis, the second axis being parallel to but eccentric from the worm axis; and
   means for pivoting the bearing housing between a first position providing a minimum fit between the worm and gear and a second position providing rigid frictional locking between the worm and gear.

2. The improvement of claim 1, wherein the pivoting means provides rigid locking upon completion of drive by the worm.

3. The improvement of claim 2, wherein a base plane is defined containing the second axis and perpendicular to the gear and a pivoting plane is defined by the two axes, said pivoting plane in the first housing position being at a first angle on one side of the base plane, and said pivoting plane in the second housing position being at a second angle on the other side of said base plane, said first and second angles being substantially equal.

4. The improvement of claim 2, wherein the means for pivoting is responsive to a termination of driving power.

5. The improvement of claim 4, wherein the means for pivoting comprises a fluid cylinder.

6. A locking worm and gear drive, comprising:
   a base;
   a gear rotatably mounted with respect to the base;
   a pair of bearing housings mounted for rotation about a first axis fixed with respect to the base;
   bearings mounted in the housings and defining a second axis parallel to but eccentric from the first axis;
   a worm supported for rotation within the bearings about the second axis and drivably engaging the gear; and
   means for pivotably biasing the bearing housings about the first axis to move the worm toward the gear to provide a minimum fit during driving and a rigid static frictional locking upon cessation of driving.

7. In a mount for equipment, including a drive housing and a platform supporting the equipment and being pivotally mounted to the drive housing, a drive comprising:
   a gear secured for pivoting with the platform;
   a pair of bearing housings mounted to the drive housing for rotation about a first axis;
   a worm mounted within the bearing housings for rotation about a second axis parallel to but eccentric from the first axis, said worm drivably engaging the gear; and
   means for pivotably biasing the bearing housings with respect to the drive housing to bias the worm toward the gear to provide a minimum fit during driving and a rigid static frictional locking upon cessation of driving.

8. The improvement of claim 6, wherein the biasing means provides a biasing force of between 6 and 10 pounds.

9. The improvement of claim 6, wherein the housings are disposed so as to be constantly biased toward rotation about the second axis by gravity.

10. The improvement of claim 6, wherein the biasing means is a magnetic force.

11. The drive of claim 6, wherein the biasing means is a spring.

12. The drive of claim 7, wherein the biasing means is a spring.

13. The drive of claim 7, wherein the biasing means provides a biasing force of between 6 and 10 pounds.

14. The drive of claim 7, wherein the housings are disposed so as to be constantly biased toward rotation about the first axis by gravity.

15. The drive of claim 7, wherein the biasing means is a magnetic force.

* * * * *